United States Patent [19]

Moss

[11] 4,341,037
[45] Jul. 27, 1982

[54] GAME CALL

[76] Inventor: Robert R. Moss, Rte. 2, Cole Camp, Mo. 65325

[21] Appl. No.: 255,889

[22] Filed: Apr. 20, 1981

[51] Int. Cl.³ .............................................. A63H 5/00
[52] U.S. Cl. ......................................... 46/178; 46/180
[58] Field of Search .................. 46/178, 180, 181, 182

[56] References Cited

U.S. PATENT DOCUMENTS

| | | | |
|---|---|---|---|
| 711,090 | 10/1902 | Zilkie | 46/180 |
| 1,367,176 | 2/1921 | Bridges | 46/180 |
| 2,385,752 | 9/1945 | Wilson | 46/181 |
| 2,493,472 | 1/1950 | Yentzen | 46/180 |
| 2,513,600 | 4/1950 | Thompson | 46/182 |
| 2,525,134 | 10/1950 | Horne | 46/182 |
| 2,729,025 | 1/1956 | Jones | 46/180 |
| 3,738,056 | 6/1973 | Schultz | 46/178 |
| 4,143,485 | 3/1979 | Stewart | 46/180 |

Primary Examiner—Paul J. Hirsch
Attorney, Agent, or Firm—Polster, Polster and Lucchesi

[57] ABSTRACT

A game call has a plurality of planar, thin, flexible diaphragms separated from one another by at least one frame. Each of the diaphragms has a free open edge and is sealed around the remaining portion of its edge. The free edges of adjacent diaphragms are of different effective lengths.

6 Claims, 5 Drawing Figures

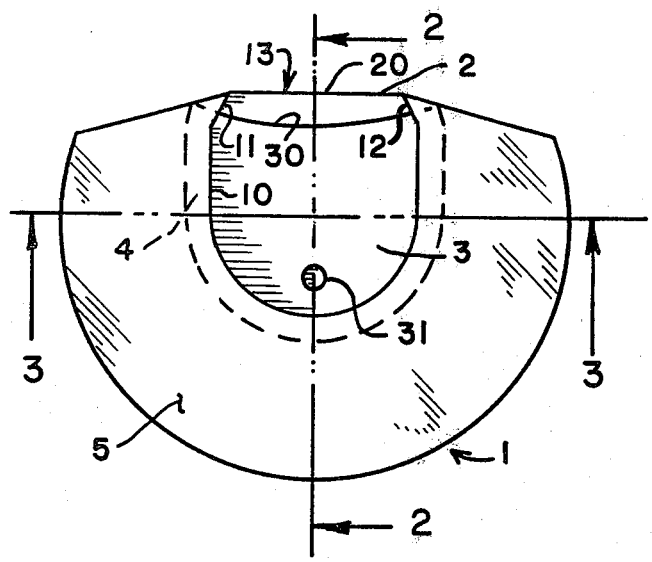
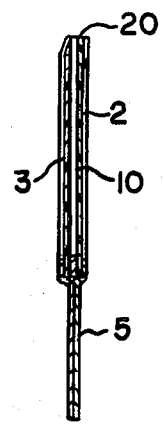
FIG. 1.    FIG. 2.
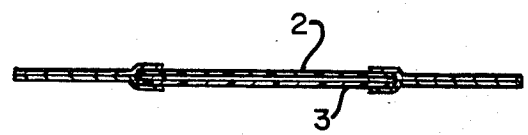
FIG. 3.
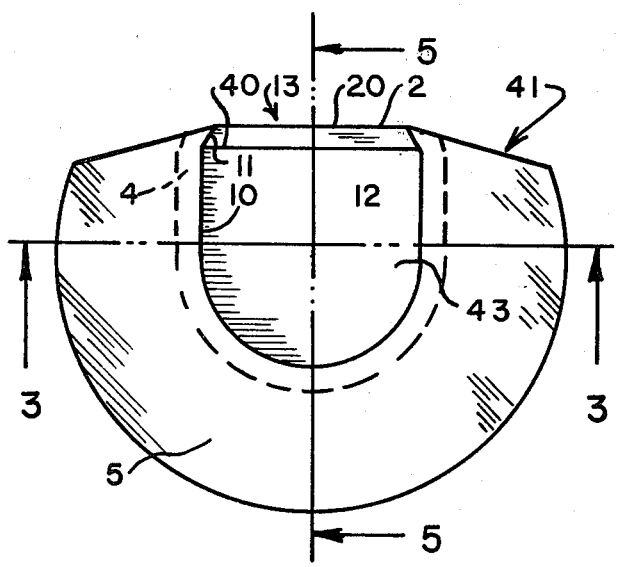
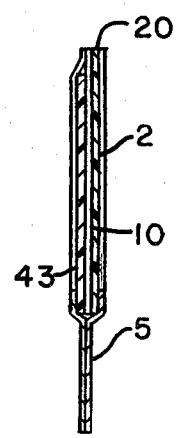
FIG. 4.    FIG. 5.

GAME CALL

BACKGROUND OF THE INVENTION

This invention has to do with game calls, such as turkey calls, of the type that is operated by blowing across a thin diaphragm, and particularly of the type in which more than one diaphragm is used. Commonly, if more than one diaphragm has been used, they have been placed back to back with no space between them, and with the open edges of the diaphragms of exactly the same length. With such calls, it is difficult to produce a double tone, and the tone that is produced is hardly more effective than the tone produced by a single diaphragm.

One of the objects of this invention is to provide a game call that is simple and easy to use, and that produces a multiple tone that is more effective in calling game than such calls known heretofore.

Other objects will become apparent to those skilled in the art in the light of the following description and accompanying drawing.

SUMMARY OF THE INVENTION

In accordance with this invention, generally stated, a game call is provided, with a plurality of planar, thin, flexible diaphragms separated from one another by at least one frame-spacer. Each of the diaphragms has a free, open edge. The diaphragm is sealed around the remaining portion of its edge. The free edges of adjacent diaphragms are of different effective lengths. In the preferred embodiment, the frame is harp or horseshoe shaped, with a mouth defined by inner edges that tend convergently. Diaphragms on opposite sides of the frame are offset from one another with respect to the mouth, so as to make the effective lengths of the free edges of the diaphragms and the effective depths of the diaphragms sufficently different to produce distinctly different tones when the diaphragms are vibrated by blowing across their open free edges. One or more of the diaphragms can be ported, and the free open edges of the diaphragms can be made either linear or non-linear.

BRIEF DESCRIPTION OF THE DRAWINGS

In the drawing,

FIG. 1 is a view in front elevation of one embodiment of game call of this invention;

FIG. 2 is a sectional view taken along the line 2—2 of FIG. 1;

FIG. 3 is a sectional view taken along the line 3—3 of FIGS. 1 and 4;

FIG. 4 is a view in front elevation of another embodiment of game call of this invention; and FIG. 5 is a sectional view taken along the line 5—5 of FIG. 4.

DESCRIPTION OF THE PREFERRED EMBODIMENT

Referring now to FIGS. 1 through 3 for a preferred embodiment of this invention, reference numeral 1 indicates a complete turkey call. The turkey call 1 has a first diaphragm 2 and a second diaphragm 3, mounted on opposite sides of and separated from one another by a frame 4. The diaphragms and frame are sealed together by a U-shaped skirt or yoke 5 of moisture resistant, substantially impervious tape.

The frame 4 is harp or horseshoe shaped in front elevation, with an inner edge 10 defining a generally U-shaped opening, but terminating in inwardly convergent lips 11 and 12 defining between them a mouth 13. The frame is thin, and narrow as compared with the width of either the diaphragms or the yoke. The diaphragms are shaped complementarily to the outer edge of the frame, but extend around the frame slightly inboard of the outer edge, sufficiently far to permit the tape of the yoke to adhere to the edge of the frame.

The yoke 5, is formed of two pieces of tape with adhesive on their facing sides. The yoke is wide enough to permit the call to be grasped easily. It is cut out to form an opening of a shape corresponding to the inner edge 10 of the frame, and is positioned coterminously with that edge. The upper edges of the yoke, as viewed in FIG. 1, slope downwardly in a direction away from the mouth of the frame.

In this embodiment, the first diaphragm 2 has a substantially linear free edge 20 spanning between the outermost mouth-defining point of the lip 11 and the corresponding point of lip 12. The second diaphragm 3 has a concave free edge 30 spanning between a point close to the base of the lip 11 and the corresponding point of the lip 12. The free edge 30 accordingly has a longer span than the free edge 20.

In this embodiment, the diaphragm 3 has a port 31 in it, small relative to the span of the free edge of the diaphragm, centered in the side to side dimension of the frame opening, but near the edge of the diaphragm remote from the free edge 30.

Referring now to FIGS. 4 and 5 for another embodiment of this invention, a call 41 is identical in all respects with the call 1 except that a second diaphragm 43 is imperforate and has a linear free upper edge 40, rather than a concave free edge.

By way of illustration, the frame can be made of aluminum approximately 0.020" thick and $\frac{1}{8}$" wide. The distance between the lips at the point at which they define the mouth can be 0.50", and the distance between the lips at their base, which determines the span of the second diaphragm, can be about 0.53". The distance from the mouth line to the most remote point of the inner edge of the frame can be about 11/16", and the distance between the upright reaches of the inner edges, as viewed in FIGS. 1 and 4, can be about $\frac{3}{8}$". The free edge of the second diaphragm at its center can be about 0.60" below the free edge of the first diaphragm, which means that the length of the diaphragm, from its free edge to the farthest point of the inner edge of the frame is about 0.06" less than the length of the other diaphragm. The diaphragms can be made of sheet surgical rubber, approximately five mils thick. Under these circumstances, the first diaphragm, with the shorter span of its open edge will produce a pitch of about F to G above middle C, and the second diaphragm, a pitch of about D above middle C. The width of the skirt or yoke can be about $\frac{1}{2}$".

The provision of the port in one or both of the diaphragms helps to keep the reeds apart and permits a somewhat lower note to be obtained, besides permitting more volume of sound and greater control than an unperforated diaphragm. The provision of the non-linear edge, which can be convex or irregular, produces a tone variation that is effective. The call of this invention enables the caller to produce a soft call, and at the same time a distinctly multi-pitched call, which has not been possible heretofore. It can be appreciated that, by using one or more additional frames, three or more diaphragms, each separated from the others, can be employed.

Numerous variations in the construction of the call of this invention, within the scope of the appended claims, will occur to those skilled in the art in the light of the foregoing disclosure. Merely by way of example, a plurality of ports can be provided in one or a plurality of diaphragms. The free edge of more than one diaphragm can be made non-linear. Other diaphragm material can be used, such, for example, as mylar, polyethylene, PVC and cellulose films, but surgical rubber sheeting about three to six mils thick is the preferred material. Other frame materials can be used, such, for example, as stainless steel. The inner edge of the frame can be stepped, rather than sloped, to define spans of different lengths for the open edges of the diaphragms. These are only illustrative.

I claim:

1. A game call comprising a plurality of planar, thin, flexible diaphragms separated from one another by at least one U-shaped, flat-sided frame of a thickness greater than said diaphragms, whereby said diaphragms lie in parallel planes, each of said diaphragms having a free open edge and being sealed around the remaining portion of its edge, the free edges of adjacent diaphragms being of different effective lengths.

2. The call of claim 1 wherein the frame has a mouth defined by edge portions convergently directed toward said mouth, the open edge of one diaphragm being positioned nearer the said mouth than its adjacent diaphragm, whereby the effective open edge of said one diaphragm is shorter than the open edge of the other.

3. The call of claim 2 wherein the frame is horseshoe-shaped, and the said one diaphragm is less deep as measured from its open edge to the bottom of the U of the frame than the said adjacent diaphragm.

4. The call of claim 1 wherein at least one of the diaphragms has a port in it, small in diameter compared with the span of the open edge.

5. The call of claim 1 wherein the open edge of at least one of the diaphragms is non-linear.

6. The call of claim 5 wherein said non-linear edge is concave.

* * * * *